US012725239B2

(12) United States Patent
Kairali et al.

(10) Patent No.: US 12,725,239 B2
(45) Date of Patent: Sep. 1, 2026

(54) UNDERWATER MACHINERY PERFORMANCE ANALYSIS USING SURFACE SENSORS

(71) Applicant: INTERNATIONAL BUSINESS MACHINES CORPORATION, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 18/045,254

(22) Filed: Oct. 10, 2022

(65) Prior Publication Data

US 2024/0119580 A1 Apr. 11, 2024

(51) Int. Cl.
*G06T 7/00* (2017.01)
*G01M 99/00* (2011.01)
*G06T 7/60* (2017.01)

(52) U.S. Cl.
CPC ......... *G06T 7/0004* (2013.01); *G01M 99/005* (2013.01); *G06T 7/60* (2013.01); *G06T 2207/20081* (2013.01); *G06T 2207/20084* (2013.01); *G06T 2207/30164* (2013.01)

(58) Field of Classification Search
CPC ..................... G06T 7/0004; G06T 7/60; G06T 2207/20081; G06T 2207/20084; G06T 2207/30164; G01M 99/005; G01M 7/00; G01M 10/00
See application file for complete search history.

(56) References Cited

U.S. PATENT DOCUMENTS 5,333,240 A 7/1994 Matsumoto et al.
8,515,880 B2 8/2013 Holley
9,892,744 B1 * 2/2018 Salonidis ........... G05B 23/0237
(Continued)

FOREIGN PATENT DOCUMENTS

CN 116147944 A * 5/2023 .......... G01M 99/005
CN 116894223 A 10/2023
DE 4012278 A1 10/1990
(Continued)

OTHER PUBLICATIONS

Anonymous. "IBM Maximo Application Suite: Asset management." Printed Jul. 8, 2022. 6 pages. Published by IBM. https://www.ibm.com/products/maximo/asset-management.
(Continued)

*Primary Examiner* — Scott T Baderman
(74) *Attorney, Agent, or Firm* — Kimberly Zillig

(57) ABSTRACT

A system, method, and computer program product perform audio-visual inspection at a surface of a liquid over machinery that is operating under the surface. The audio-visual inspection includes each of feeding surface wave movements into a neural network, feeding bubble formation pattern into the neural network, feeding bubble dimensions into the neural network, and feeding underwater acoustic information to the neural network. The system, method, and computer program product further identify, using the neural network, a statistical anomaly from the audio-visual inspection indicating an anomaly of the performance of the machinery.

17 Claims, 3 Drawing Sheets

(56) References Cited

U.S. PATENT DOCUMENTS

| | | | | |
|---|---|---|---|---|
| 2021/0256991 | A1* | 8/2021 | Jun | G10L 25/18 |
| 2022/0044022 | A1 | 2/2022 | Gan et al. | |

FOREIGN PATENT DOCUMENTS

| | | | | |
|---|---|---|---|---|
| JP | H0692914 | B2 * | 11/1994 | G01H 1/003 |
| JP | 2016174782 | A | 10/2016 | |
| JP | 7339556 | B2 * | 9/2023 | G01M 3/10 |
| KR | 20140013789 | A | 2/2014 | |
| WO | 2018179705 | A1 | 10/2018 | |

OTHER PUBLICATIONS

Inzartsev, et al., "Inspection of the Underwater Industrial Objects Using AUV Based on the Method of Feature Points Video Recognition." Published in 2022 by IOP. 10 pages. In IOP Conf. Ser.: Earth Environ. Sci. 988 032091. https://iopscience.iop.org/article/10.1088/1755-1315/988/3/032091/pdf.

Tang, et al., "Study on acoustic fault diagnosis of underwater vehicle auxiliary machineries." Published Dec. 2021 by Research Gate. 7 pages. In Vibroengineering PROCEDIA 39:87-93. DOI:10.21595/vp.2021.22229.

Tsai, et al., "Multi-Sensor Fault Diagnosis of Underwater Thruster Propeller Based on Deep Learning." Published Oct. 29, 2021 by MDPI. 20 pages. In Sensors 2021, 21, 7187. https://doi.org/10.3390/s21217187.

International Search Report, International Application No. PCT/CN2023/123545, Dec. 21, 2023, 8 pgs.

* cited by examiner

UNDERWATER MACHINERY PERFORMANCE ANALYSIS USING SURFACE SENSORS

BACKGROUND

In various applications it is advantageous and/or necessary for machinery to operate under a fluid, such as underwater. This might include one or more moving parts that are actively engaging water as they actuate (e.g., rather than being within a sealed housing). Examples of underwater machinery includes oil extraction machines, underwater navigation systems, ships, underwater pumps, and the like.

SUMMARY

Aspects of the present disclosure relate to a method, system, and computer program product relating to analyzing underwater machinery using surface sensors. For example, the method includes performing audio-visual inspection at a surface of a liquid over machinery that is operating under the surface. The audio-visual inspection includes each of feeding surface wave movements into a neural network, feeding bubble formation patterns into the neural network, feeding bubble dimensions into the neural network, and feeding underwater acoustic information to the neural network. The method further includes identifying, using the neural network, a statistical anomaly from the audio-visual inspection indicating an anomaly of the performance of the machinery. A system and computer program configured to execute the method described above are also described herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
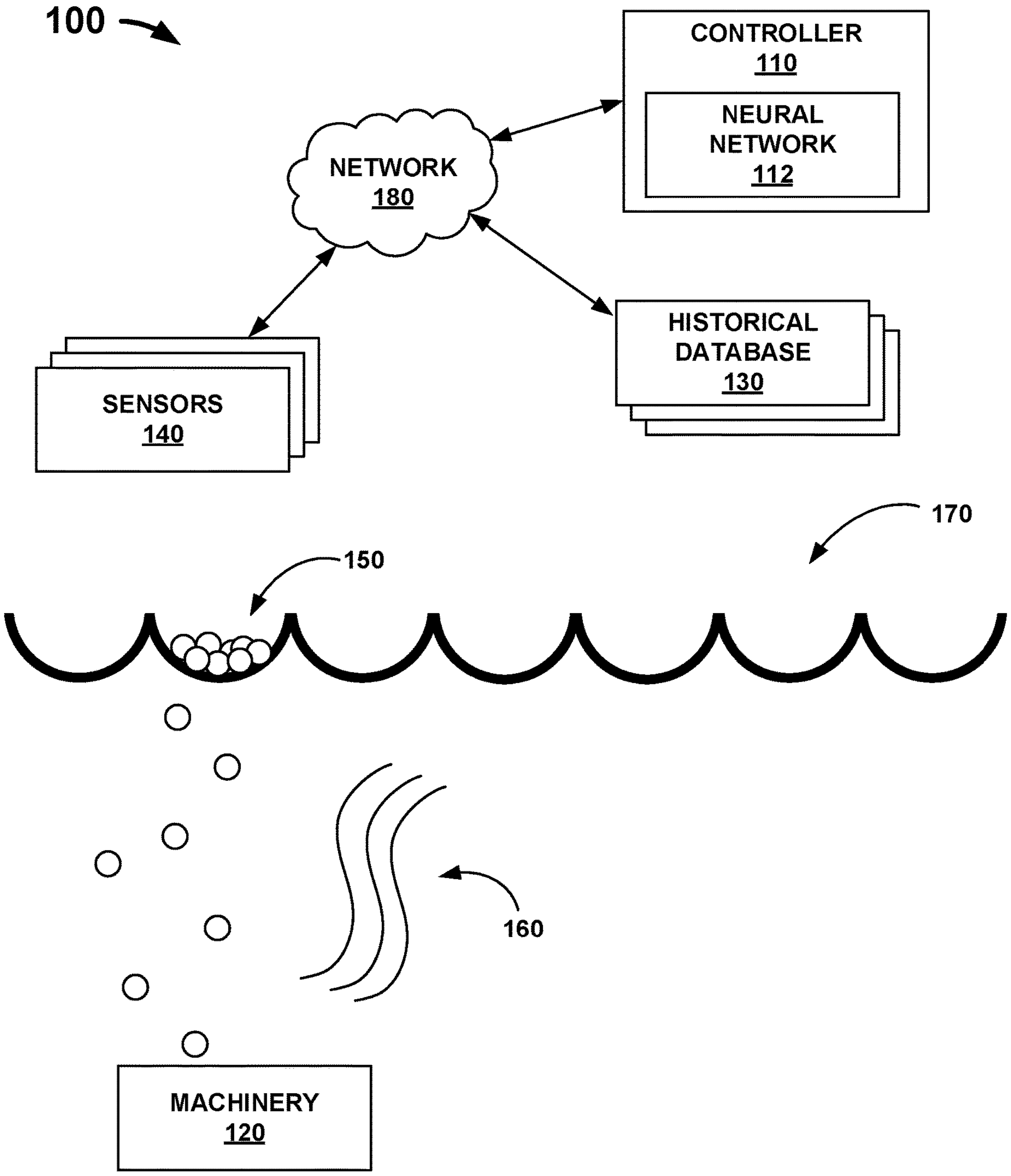
FIG. 1 depicts a conceptual diagram of an example system in which controller may analyze a performance of underwater machinery using surface sensors.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to underwater machinery analysis, while more particular aspects of the present disclosure relate to using data from surface sensors as feed into a neural network to analyze a performance of the machinery and determine corrective actions as necessary. While the present disclosure is not necessarily limited to such applications, various aspects of the disclosure may be appreciated through a discussion of various examples using this context.

Using underwater machinery is becoming increasingly common as we look to settle in new locations and utilize lakes and seas around an increasing amount. Underwater machines can have various problems because of pressure applied to the machinery by the water, a (hot or cold) temperature of the water, a speed of the flow of the water, etc. For another example, pseudo-constant vibration caused by operating underwater can align with resonance frequencies of the materials of the machinery and might cause microcracks, unbalanced force distribution, friction with a support structure, or the like. The problems that can arise from underwater utilizations are myriad, such as loosening bolts, bending in any particular pipe, or any other types of mechanical/material/electrical failure that might arise because of the peculiarities of operating underwater. These issues can arise with different severities, such that some can be minor and therein can be ignored (at least for a period of time), and some can require being addressed immediately to avoid catastrophic damage to the machinery.

Aspects of this disclosure may detect these issues. For example, aspects of this disclosure are configured to perform audio-visual inspection using sensors at the surface of the water above underwater machines. Specifically, if an underwater device is having a problem, then it might vibrate in an atypical manner as a result of how the machinery is moving underwater. The generated vibration from the machine might create waves and/or bubbles on the surface of the water. Further, the vibration of the underwater machinery may generate a new sound, e.g., because of a change in one or more air columns.

Aspects of the disclosure may detect these waves (whether physical or audio) and/or bubbles via an audio-visual inspection via one or more water surface wave movement patterns, bubble formation patterns, analysis of the dimension of the bubbles, underwater acoustic wave propagation pattern, and the like. Aspects of this disclosure are configured to identify any anomalies in the performance of the underwater machinery as exhibited by these bubbles and/or waves and accordingly identify if proactive corrective action are recommended (and if so, determined which corrective actions are recommended).

One or more computing devices that include one or more processing units executing instructions stored on one or more memories may provide the functionality that addresses these problems, where said computing device(s) are herein referred to as a controller. The controller may analyze how the machinery creates waves and/or bubbles in creating a profile or baseline of the machinery. The controller may then compare how the generated waves and/or bubbles compare against this baseline of the machinery, determining that there is an anomaly in the performance of the machinery when the waves and/or bubbles indicate a deviation greater than a threshold from this baseline.

The controller may further analyze and balance various factors in determining what variety of corrective action to determine, and or whether to execute this corrective action autonomously. For example, the controller may determine if there is a danger level above a threshold, a quota that needs to be hit, a timeframe of operation that is soon to expire, or the like in evaluating potential corrective actions. The corrective action may include repairing the machine, changing a manner of operating the machine, removing the machine from the water, or the like. The controller may determine this based on the wave formation pattern on the water surface, dimensions of the bubbles at the water surface, a rate of generation of bubbles and/or waves.

For example, FIG. 1 depicts environment 100 in which controller 110 may analyze machinery 120 using sensors 140. Controller 110 may use data from sensors 140 to analyze waves 160 and/or bubbles 150. Waves 160 may be audio waves and/or physical waves generated by the water 170. It is to be noted that while water is the fluid discussed predominately herein, aspects of this disclosure relate to any fluid under which machinery 120 may operate and through which bubbles 150 and/or waves 160 would propagate.

Figure 3:
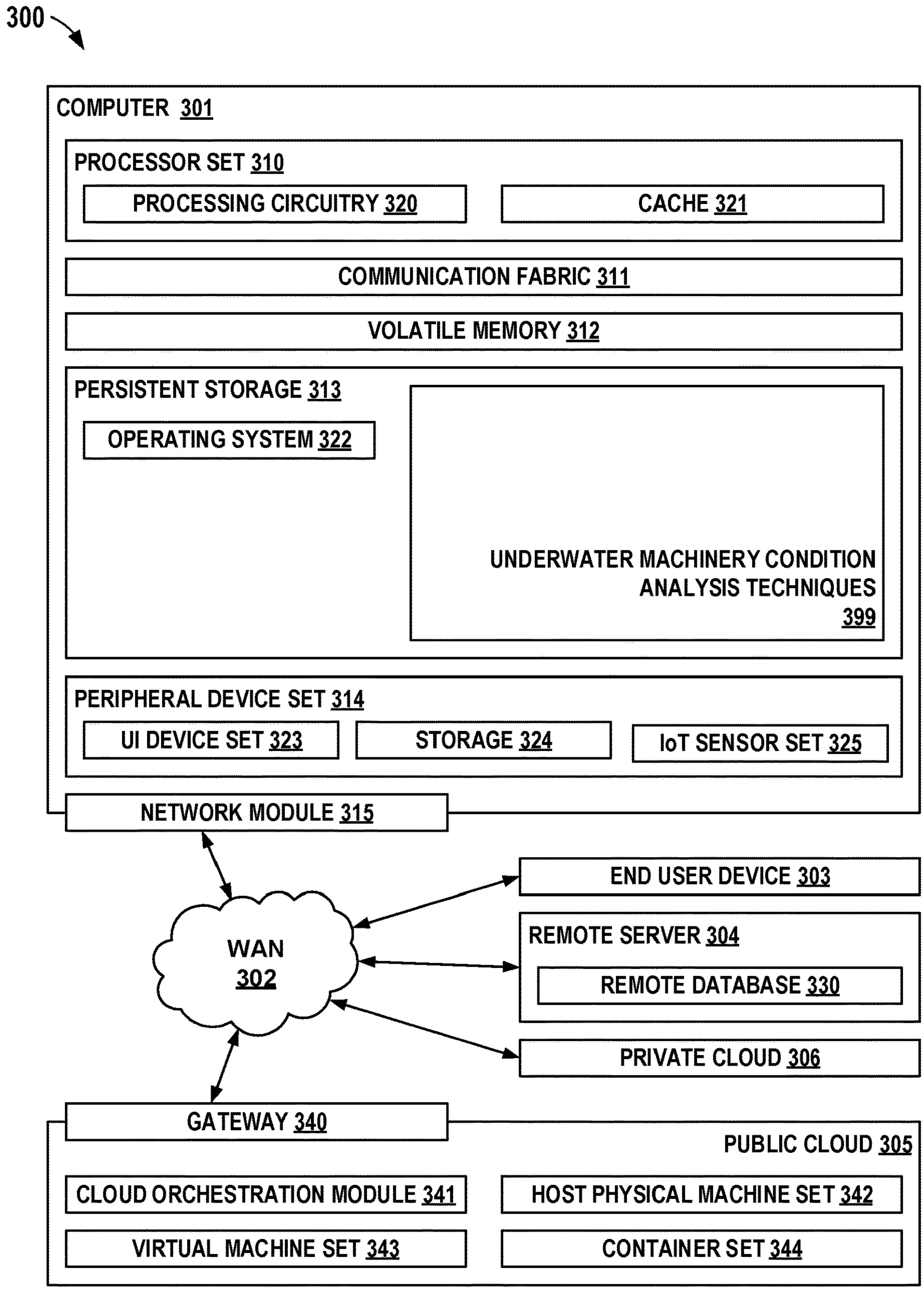
FIG. 3 depicts a conceptual box diagram of a computing system that may host and/or include the controller of FIG. 1.

Controller 110 may compare data from sensors 140 against historical databases 130 using neural network 112. Controller 110 may include a processor coupled to a memory (as depicted in FIG. 3) that stores instructions that cause controller 110 to execute the operations discussed herein. Though controller 110 is depicted as being structurally distinct from sensors 140 and historical database(s) 130, in some embodiments controller 110 may share some computing components with sensors 140 and/or historical databases 130.

Controller 110 may interact with sensors 140 and/or historical databases 130 using network 180. Network 180 may include a computing network over which computing messages may be sent and/or received. For example, network 180 may include the Internet, a local area network (LAN), a wide area network (WAN), a wireless network such as a wireless LAN (WLAN), or the like. Network 180 may comprise copper transmission cables, optical transmission fibers, wireless transmission, routers, firewalls, switches, gateway computers and/or edge servers. A network adapter card or network interface in each computing/processing device (e.g., computing devices that host/include sensors 140 and/or historical databases 130) may receive messages and/or instructions from and/or through network 180 and forward the messages and/or instructions for storage or execution or the like to a respective memory or processor of the respective computing/processing device. Though network 180 is depicted as a single entity in FIG. 1 for purposes of illustration, in other examples network 180 may include a plurality of private and/or public networks.

Sensors 140 may include cameras that record images of a surface of the water 170. When machinery 120 is in the water 170 and operating, then the machinery 120 can generate sound and/or vibrations. If machinery 120 experiences some problems, machinery 120 may generate vibration as a result of an unbalance force. This vibration may propagate through the water 170. Similarly, if machinery 120 generates sound, then the sound will also be propagated through the water 170.

Controller 110 may use any variety of microphones, cameras, or the like to execute an audio-visual inspection of machinery 120 from the upper surface of the water 170 above machinery 120. In some examples, controller 110 may utilize a drone or other unmanned vehicle (e.g., an unmanned aerial vehicle, or an unmanned water vehicle) perform inspection in the water surface. Sensors 140 may include a microphone array that can be submerged in the water 170 to capture the sound propagation in the water 170.

Controller 110 may identify an "allowable" range of vibration in any machinery 120, such that if controller 110 detects vibrations that are outside of this range that controller 110 may determine whether machinery 120 is having any problem, like a loosened bolt, a missing screw, or the like.

In some examples (not depicted), there may be multiple machinery 120 in environment 100, and accordingly each and every machinery 120 can generate vibration/sound. Accordingly, controller 110 may utilize different sensors 140 for each machinery 120, and/or controller 110 may use data from some sensors 140 that are able to monitor multiple machinery systems 120.

Controller 110 may analyze the dimensions (e.g., size, shape, number, duration) of bubbles 150. Controller 110 may specifically analyze whether or not these bubble 150 dimensions changes as they are generated on top of water. Controller 110 may store data on machinery 120 within historical database 130. In some examples, controller 110 may reference detected bubbles 150, and/or waves 160 (whether physical waves or sound waves) against data from this historical database 130.

In some examples, controller 110 may gather data directly from machinery 120 itself. For example, controller 110 may gather data from machinery 120 as to an error code that machinery 120 is generating. Controller 110 may receive this error code from machinery 120 after controller 110 had already received an atypical bubble 150 and/or wave 160 pattern for a period of time, after which controller 110 may determine that the atypical bubble 150 and/or wave 160 pattern is a predictive indicator of the error code occurring in the near future.

Figure 2:
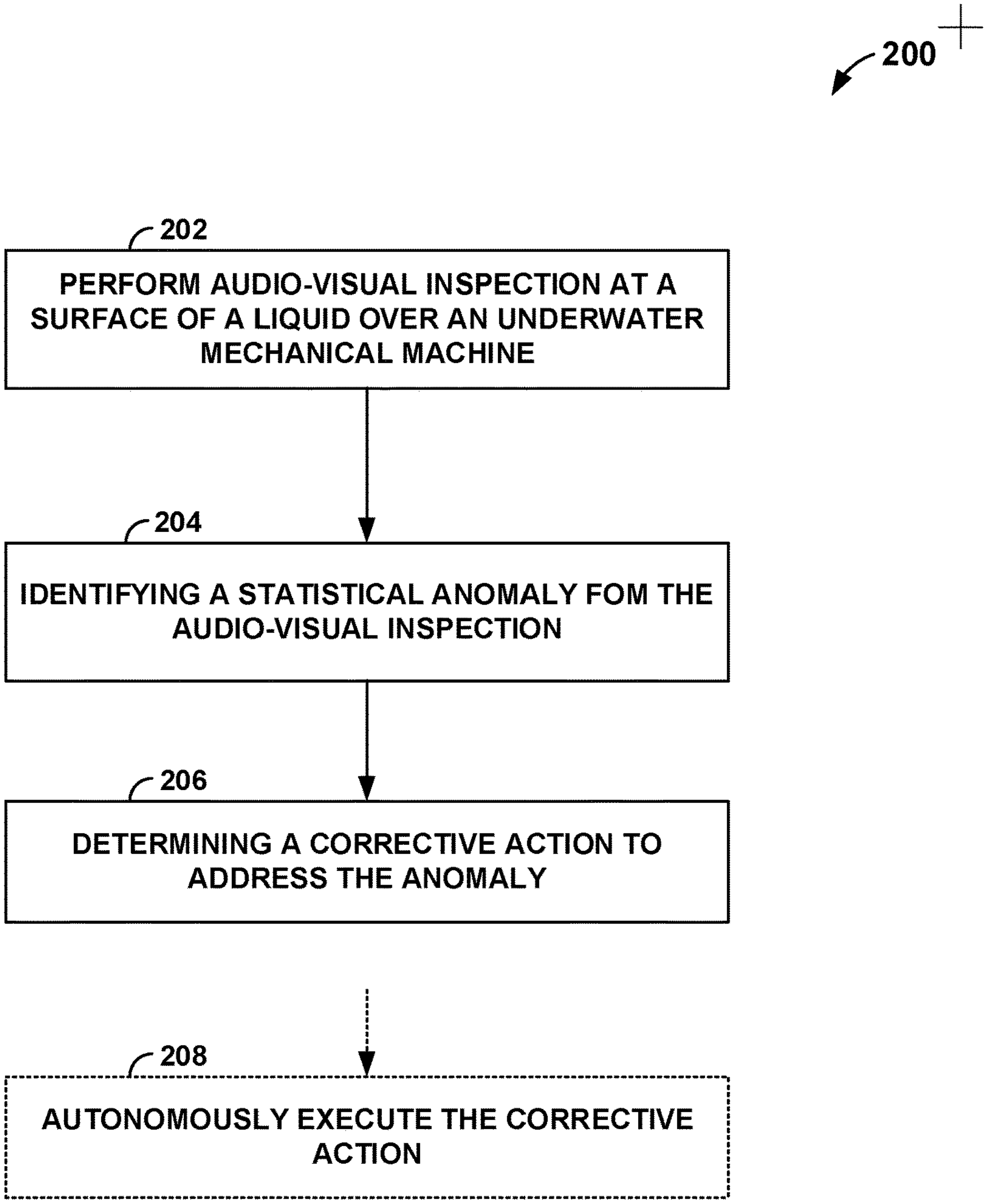
FIG. 2 depicts an example flowchart by which the controller of FIG. 1 may analyze a performance of the underwater machinery and determine a corrective action as necessary.

Controller 110 may manage underwater machinery performance according to flowchart 200 depicted in FIG. 2. Flowchart 200 of FIG. 2 is discussed with relation to FIG. 1 for purposes of illustration, though it is to be understood that other environments with other components may be used to execute flowchart 200 of FIG. 2 in other examples. Further, in some examples controller 110 may execute a different method than flowchart 200 of FIG. 2, or controller 110 may execute a similar method with more or less steps in a different order, or the like.

Controller 110 performs audio-visual inspection at a surface of a liquid over a machinery 120 that is operating under the surface (202). The audio-visual inspection includes feeding surface wave movements into a neural network 112, feeding bubble 150 formation pattern into the neural network 112, feeding bubble 150 dimensions into the neural network 112, and feeding underwater acoustic information to the neural network 112.

Controller 110 identifies, using the neural network 112, a statistical anomaly from the audio-visual inspection indicating an anomaly of the performance of the machinery 120 (204). Neural network 112 may identify the anomaly from the audio-visual inspection via neural network 112 learning how various vibration and sounds of machinery 120 cause surface wave 160 movements and bubble 150 formation pattern and bubble 150 dimensions and underwater acoustic information in order to identify a change in vibration of machinery 120.

Controller 110 determines a corrective action to take to address the anomaly of the performance of the machinery 120 (206). Controller 110 may determine the corrective action by analyzing a correlation between the statistical anomaly and a chance of a failure of the machinery 120. Alternatively, or additionally, controller 110 may determine the corrective action by identifying a timeframe within which the correction action must be executed.

In some examples, controller 110 autonomously executes the corrective action (208). In other examples, controller 110 generates a notification for a user that details the corrective action and the anomaly of the performance.

As described above, controller 110 may include or be part of a computing device that includes a processor configured to execute instructions stored on a memory to execute the techniques described herein. For example, FIG. 3 is a conceptual box diagram of a computer 301 that can host controller 110. While controller 110 is depicted as a single entity (e.g., within a single housing) for the purposes of illustration, in other examples, controller 110 may include two or more discrete physical systems (e.g., within two or more discrete housings). Controller 110 may include interface, processor, and memory. Controller 110 may include any number or amount of interface(s), processor(s), and/or memory(s).

Computing environment 300 contains an example of an environment for the execution of at least some of the computer code involved in performing the inventive methods, such as underwater machinery condition analysis techniques 399. In addition to underwater machinery condition analysis techniques 399, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and underwater machinery condition analysis techniques 399, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in underwater machinery condition analysis techniques 399 in persistent storage 313.

Communication fabric 311 is the signal conduction path that allows the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, volatile memory 312 is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface-type operating systems that employ a kernel. The code included in underwater machinery condition analysis techniques 399 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN 302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

In addition to underwater machinery condition analysis techniques 399, in some examples gathered or predetermined data or techniques or the like as used by processor set 310 to manage underwater machinery performance. For example, persistent storage 313 may include information described above that is gathered from environment 100. Specifically, memory 313 may include some or all data gathered from sensors 140, and/or persistent storage may include some or all data of historical databases 130.

Further, persistent storage 313 may include threshold and preference data. Threshold and preference data may include thresholds that define a manner in which controller 110 is to manage the analysis of underwater machinery. For example, the threshold and preference data may include thresholds at which controller 110 executes various tasks as described above, such as user-provided thresholds. For another example, threshold and performance data may include thresholds at which controller 110 is to suggest a corrective action. For example, controller 110 may be configured to autonomously execute a corrective action when the underlying predicted anomaly is expected to have a severity that surpasses a threshold severity.

Persistent storage 313 may further include machine learning techniques that controller 110 may use to improve a process of analyzing and managing underwater machinery performance as described herein over time. Machine learning techniques can comprise algorithms or models that are generated by performing supervised, unsupervised, or semi-supervised training on a dataset, and subsequently applying the generated algorithm or model to manage underwater machinery performance. Using these machine learning techniques, controller 110 may improve an ability to detect deviations of underwater machinery performance and then responsively manage that underwater machinery performance.

Machine learning techniques can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Specifically, machine learning techniques can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

What is claimed is:

1. A computer-implemented method comprising:

performing audio-visual inspection at a surface of a liquid over a machinery that is operating under the surface, wherein the audio-visual inspection includes:

feeding surface wave movements into a neural network;

feeding bubble formation patterns into the neural network;

feeding bubble dimensions into the neural network; and feeding acoustic information to the neural network;

identifying, using the neural network, a statistical anomaly from the audio-visual inspection indicating an anomaly of a performance of the machinery;

determining a corrective action to address the anomaly of the performance of the machinery; and executing the corrective action.

2. The computer-implemented method of claim 1, wherein the executing the corrective action includes autonomously executing the corrective action.

3. The computer-implemented method of claim 1, further comprising generating a notification for a user that details the corrective action and the anomaly of the performance.

4. The computer-implemented method of claim 1, wherein determining the corrective action includes analyzing a correlation between the statistical anomaly and a chance of a failure of the machinery.

5. The computer-implemented method of claim 1, wherein determining the corrective action includes identifying a timeframe within which the corrective action must be executed.

6. The computer-implemented method of claim 1, wherein the neural network identifying the anomaly from the audio-visual inspection includes the neural network learning how various vibration and sounds of the machinery cause surface wave movements and bubble formation pattern and bubble dimensions and underwater acoustic information in order to identify a change in vibration of the machinery away from a baseline.

7. A system comprising:
a processor; and
a memory in communication with the processor, the memory containing instructions that, when executed by the processor, cause the processor to:
perform audio-visual inspection at a surface of a liquid over a machinery that is operating under the surface, wherein the audio-visual inspection includes:
feeding surface wave movements into a neural network;
feeding bubble formation patterns into the neural network;
feeding bubble dimensions into the neural network; and
feeding acoustic information to the neural network;
identify, using the neural network, a statistical anomaly from the audio-visual inspection indicating an anomaly of a performance of the machinery;
determine a corrective action to address the anomaly of the performance of the machinery; and
execute the corrective action.

8. The system of claim 7, wherein the execute the corrective action includes autonomously execute the corrective action.

9. The system of claim 7, the memory containing additional instructions that, when executed by the processor, cause the processor to generate a notification for a user that details the corrective action and the anomaly of the performance.

10. The system of claim 7, wherein determining the corrective action includes analyzing a correlation between the statistical anomaly and a chance of a failure of the machinery.

11. The system of claim 7, wherein determining the corrective action includes identifying a timeframe within which the corrective action must be executed.

12. The system of claim 7, wherein the neural network identifying the anomaly from the audio-visual inspection includes the neural network learning how various vibration and sounds of the machinery cause surface wave movements and bubble formation pattern and bubble dimensions and underwater acoustic information in order to identify a change in vibration of the machinery away from a baseline.

13. A computer program product, the computer program product comprising a computer readable storage medium having program instructions embodied therewith, the program instructions executable by a computer to cause the computer to:
perform audio-visual inspection at a surface of a liquid over a machinery that is operating under the surface, wherein the audio-visual inspection includes:
feeding surface wave movements into a neural network;
feeding bubble formation pattern into the neural network;
feeding bubble dimensions into the neural network; and
feeding underwater acoustic information to the neural network; and
identify, using the neural network, a statistical anomaly from the audio-visual inspection indicating an anomaly of a performance of the machinery;
determine a corrective action to address the anomaly of the performance of the machinery; and
execute the corrective action.

14. The computer program product of claim 13, wherein the execute the corrective action includes autonomously execute the corrective action.

15. The computer program product of claim 13, the computer readable storage medium containing additional program instructions that, when executed by the computer, cause the computer to generate a notification for a user that details the corrective action and the anomaly of the performance.

16. The computer program product of claim 13, wherein determining the corrective action includes analyzing a correlation between the statistical anomaly and a chance of a failure of the machinery.

17. The computer program product of claim 13, wherein determining the corrective action includes identifying a timeframe within which the corrective action must be executed.

* * * * *